Sept. 6, 1938.　　　　N. J. POUX　　　　2,129,444
MACHINE FOR FORMING SEPARABLE FASTENERS
Original Filed Feb. 6, 1934　　8 Sheets-Sheet 4

INVENTOR.
Noel J. Poux
BY
ATTORNEYS.

Sept. 6, 1938.   N. J. POUX   2,129,444
MACHINE FOR FORMING SEPARABLE FASTENERS
Original Filed Feb. 6, 1934   8 Sheets-Sheet 8

Patented Sept. 6, 1938

2,129,444

UNITED STATES PATENT OFFICE 2,129,444

MACHINE FOR FORMING SEPARABLE FASTENERS

Noel Joseph Poux, Meadville, Pa., assignor to Talon, Inc., a corporation of Pennsylvania Application February 6, 1934, Serial No. 709,980
Renewed January 28, 1938

53 Claims. (Cl. 153—1)

The present invention is directed to a machine for shaping and attaching separable fasteners to stringers and is, in some respects, similar to the machine illustrated in my application, Serial Number 683,973, Method of forming interlocking members for separable fasteners, filed Aug. 7, 1933.

Such separable fasteners have heretofore been made with interlocking members having clamping jaws. The interlocking members are secured to stringers by closing the jaws on the stringers. Stringers with opposingly placed interlocking members are operated by sliders which swing the interlocking members fanwise into and out of engagement. In machines as more commonly made in the past the interlocking members have been formed from a strip of material and have been carried through and completed in the single machine and attached to a stringer. This former method has some very marked advantages, but at the same time some very definite disadvantages. The former practice necessitated the use of a material which would make a satisfactory finish in the completed fastener. In other words, it practically excluded the use of a cheaper material which could be made attractive by plating. It also necessitated the polishing of the formed members after their attachment to the stringers and inasmuch as this polishing action should be sufficient to remove the burrs formed in shaping the interlocking members there has always been more or less danger of injuring the stringers in this operation. One of the difficulties involved in other methods of fabricating separable fasteners has been the peculiar shape of the interlocking members and particularly the spreading jaws by which they are secured to the stringers. These jaws by reason of their necessary shape have made the selecting and segregrating of the interlocking members into guides and feeding devices very difficult. It has been commercially impractical, therefore, to pre-form the interlocking members, plate and polish them after formation as a step between the forming of the interlocking members and their attachment to the stringer. With the present invention I form the interlocking members, either singly or in pairs, with the metal closing, or bridging the open end of the jaws. This structure presents a shape which can be readily passed through a magazine, or selecting device, so as to be delivered in proper sequence and position to a feeding mechanism. In the present invention, after these blanks have been so far formed as to have the exterior shapes completed, they are delivered to a punch which removes the material closing the opening to the jaws and preferably removes some, or all of the material between the jaws and follows this operation by placing the interlocking members into position on stringers and securing the interlocking members on the stringers by closing the jaws.

In the machine operating these interlocking members in this manner it is practical to assemble and secure the interlocking members to the stringers after they have been formed and after they have been plated by a plating process if that is desired, or have been polished by a tumbling, or other operation if that is desired and the finished member as completed by the present machine provides inner surfaces of the jaws having the ordinary punching characteristics both of surface and corners by reason of which the jaws more firmly grip the stringers and assure a more definite attachment to the stringers.

In carrying out the invention, the present machine is preferably arranged to operate on pairs of interlocking members having their jaw ends secured together, the machine severing the interlocking members from each other and attaching them simultaneously to two distinct stringers so that with each cycle of the machine two interlocking members are secured to the stringers as distinguished from a single interlocking member as with machines as commonly used, thus doubling the capacity of the machine with the same frequency of cycles.

The invention also contemplates a preferable form of selecting mechanism and feeding mechanism therefrom which assures a constant delivery of formed blanks to the parts of the machine for completing the jaws and attaching the members to the stringers.

Features and details of the invention will appear from the specification and claims.

Preferred embodiments of the invention are illustrated in the accompanying drawings as follows:—

For convenient comparison reference numerals in the present application are made to correspond, where the same parts are shown and designated, in the companion method application above referred to.

The blanks used in this machine are illustrated in Figs. 2 to 6b. The blank may include a single interlocking member, as shown 6a and 6b. In these the blank has jaws 11 formed thereon in spread position, the recesses 13 and projections 14 adapted to interlock with the recesses. The ends of the jaws are closed by a web 17, the web preferably extending throughout the space between the jaws. This web with a small part of the inner jaw surface is, or may be, removed by the machine, as hereinafter described.

Figures 1, 2, 2A, 2B, 3, 4, 5, 6, 6A, 6B:
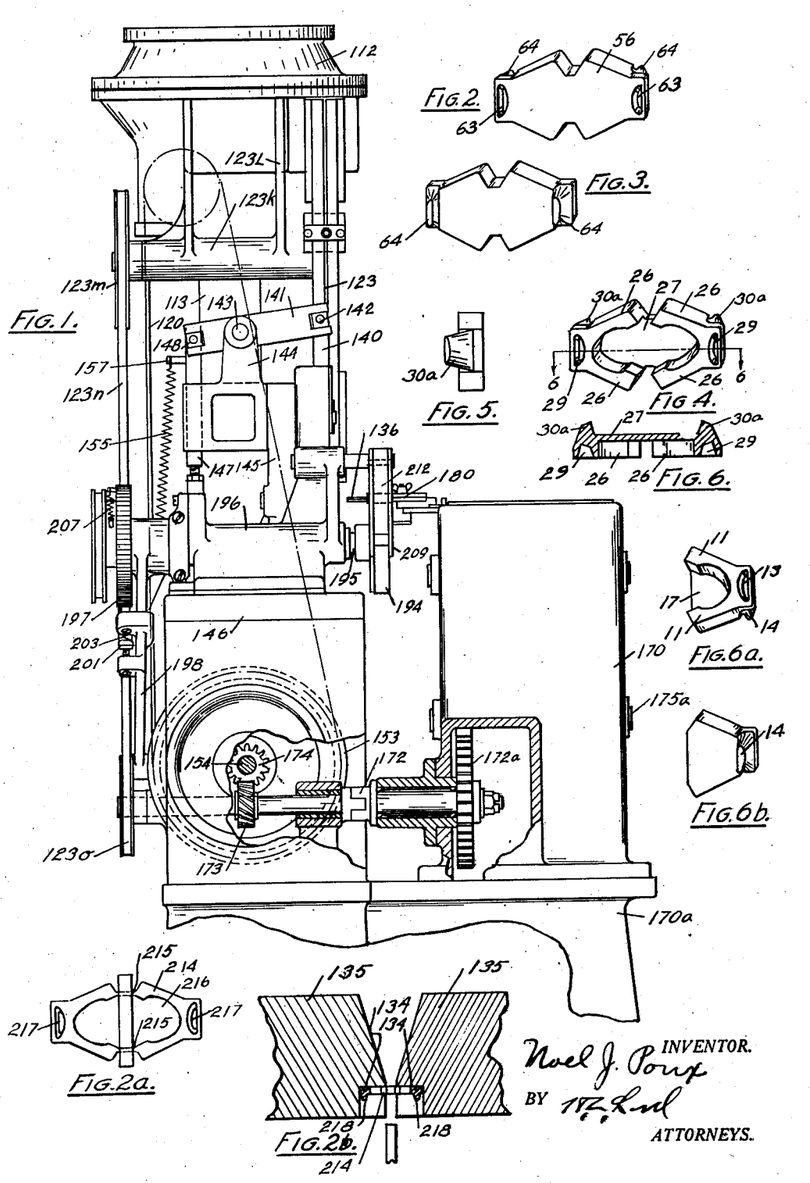
Fig. 1 shows an elevation of the machine.
Fig. 2 a perspective view of the recessed side of one of the blanks as it is delivered to the machine.
Fig. 2a a modified form of blank with a section of plunger operating on the same.
Fig. 2b a side elevation of the blank shown in Fig. 2a in place in the dies after severing the same.
Fig. 3 a perspective view of the projection side.
Fig. 4 a perspective view of a modified form of blank.
Fig. 5 an end view of the same blank.
Fig. 6 a section on the line 6—6 in Fig. 4.
Fig. 6a a perspective view of the recessed side of a similar single blank.
Fig. 6b a perspective view of the projection side of the same blank.

In the structure shown in Figs. 5 and 6 the blank involves two interlocking members having their jaw portions 26 united by a web 27 which closes the space between the jaws. The blank is provided with recesses 29 on one side and projections 30a on the opposite side which are designed to operate in the recesses.

In the modification shown in Figs. 2 and 3 the blank has the outline of two members which are united, the blank remaining solid in full thickness in that portion which forms the space between the jaws. These blanks are provided with interlocking recesses 63 which are adapted to engage with projections 64.

In Figs. 2a and 2b the blank 214 involves the complete forming of two interlocking members, the jaws being connected by small connecting parts 215, the interior space 216 between the jaws being blanked out. The blank is provided with recesses 217 adapted to interlock with projections 218.

In each of these structures the pre-forming of the blank and the tumbling, or polishing of them does not materially change the inner surface of the jaws from the condition which those surfaces assume as the space between the jaws is blanked out. In the structure shown in Figs. 2 and 3, these surfaces are formed in the blanking out as two members are severed in the present machine. In the structure shown in Figs. 5 and 6 the web is removed as the two interlocking members are severed and, if desired, a small cut may be made on the inner surfaces of the jaws. In the structure shown in Figs. 2a and 2b the inner surfaces of the jaws are pre-formed, but in the tumbling operation these surfaces are not exposed and consequently are not polished, but, if desired, a small cut may be made on the inner sides of the jaws as the connecting web, or rib, is severed in the present machine. A magazine 112 is provided for selecting the blanks and feeding them to a feed chute. This magazine is carried by a post 113 (see Fig. 7). It has a rotating platform 114 which is provided with a spindle 115 and the spindle is journaled in a bearing 116. The spindle has a gear 117 at its lower end which is driven by a gear 118. The gear 118 is driven by a shaft 118a. The shaft 118a is driven by a pulley 119 from a belt 120 leading to any convenient part of the machine. As shown it leads to a pulley 120a mounted on the main drive shaft 154 hereinafter described. The speed of the platform 114 is such as to throw the members thereon centrifugally to the outer edge and a selecting and guiding groove 121 (see Fig. 10) is arranged along the edge. The groove 121 leads to a tangential discharge groove 122 which is so shaped as to permit the entrance of blank members where the projections are right side up and properly alined by the groove 121, but does not receive members with projections otherwise arranged and under these conditions the members themselves not properly selected pass by the tangential groove and mingle with the material in the magazine. It will be noted that the groove has the laterally extending portions which are adapted to receive the plate portion of the interlocking member and has an upwardly extending groove which is adapted to receive the projection. Where there is but a single interlocking member, as shown in Fig. 6a, the plate portion swings into the outer horizontal extension of the groove and thus these single members all enter the chute with like arrangement. Where the double members are used the projections at the ends extend into the upright groove and the broader intermediate portion extends into the horizontal portion of the groove and the members are thus carried to the outlet chute properly selected and arranged to enter the chute. From the groove 122 the selected interlocking members pass into the feed chute 123 and from it to a positioning member 124.

In order that there may be no clogging at the entrance to the groove 122 a mechanism is provided which periodically ejects some of the members from the chute and groove 122 back into the magazine. This is accomplished by the following mechanism:—

Figures 9, 10, 11, 12:
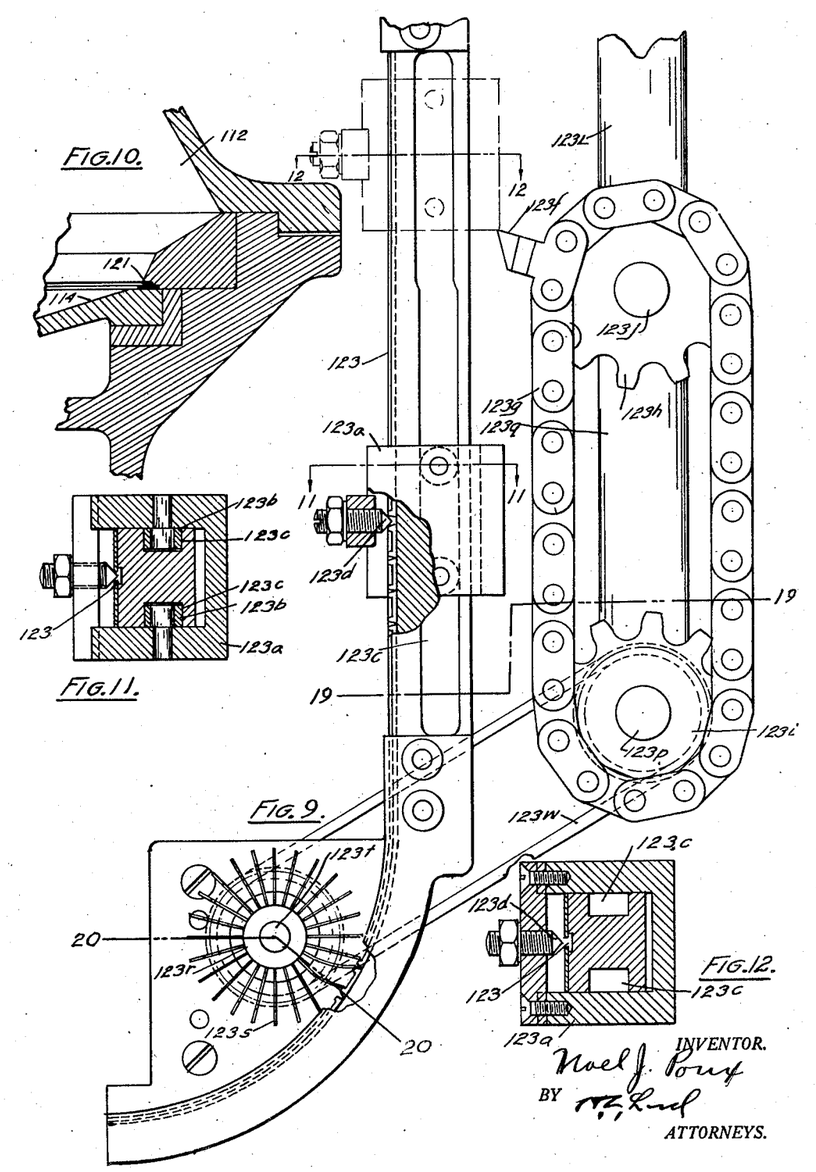
Fig. 9 an enlarged side elevation of the feed chute.
Fig. 10 an enlarged section of the feed magazine, the section being similar to the section in Fig. 7.
Fig. 11 a section on the line 11—11 in Fig. 9.
Fig. 12 a section on the line 12—12 in Fig. 9.

A block 123a is slidingly mounted on the chute. It is provided with rollers 123b which operate in grooves 123c on the chute. An adjustable finger 123d is carried by the block 123a and is adapted to engage the interlocking members in the chute, the face of the chute being provided with an open slot for this purpose. The block is in the path of a lug 123f carried by a chain 123g traveling on sprockets 123h and 123i. The sprocket 123h is fixed on a shaft 123j journaled in a bearing 123k on a hanger 123L and a pulley 123m is fixed on the shaft 123j. A belt 123n extends down to a pulley 123o on a shaft 172. The shaft 172 is provided with a helical gear 173 which meshes with a helical gear 174 on the drive shaft 154. The lower sprocket 123i is mounted on a shaft 123p journaled in a bearing 123q.

As the chain is rotated and the lug 123f engages the block 123a the block 123a is lifted and as it passes up the chute it carries with it the column of selected members above the block and ejects a number of the selected members at the upper end of the chute back into the magazine. The upper end of the guide channel 123c is off-set so that when the block approaches its upper position it is carried to the left, as shown in Fig. 9, and this brings the adjustable finger 123d out of engagement with the interlocking members in the chute. The interlocking members above the finger 132d in the chute then drop in the chute into engagement with the members below, the chute having sufficient capacity to keep the machine operating during this lifting movement of the block. The lug 123f then progresses and as it passes over the sprocket 123h is carried from under the block 123a permitting this block to drop and as it drops the finger 123d is brought again into the guide groove of the chute so as to engage the lowermost member of the new filling of the chute. In this way any jamming, or clogging at the entrance to the chute is entirely prevented.

Figure 19:
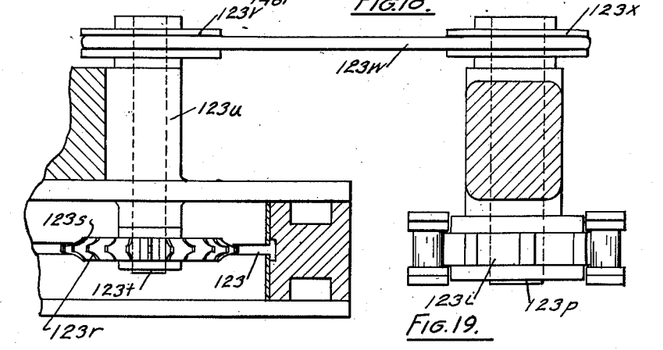
Fig. 19 a section on the line 19—19 in Fig. 9.
Figure 20:
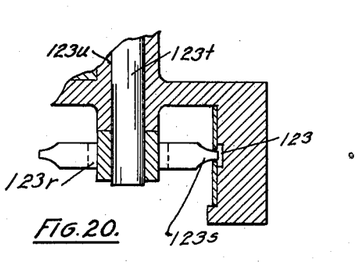
Fig. 20 a section on the line 20—20 in Fig. 9.

In order to assure the forward feeding of the members in the lower part of the chute which is deflected to the horizontal I prefer to provide a driving wheel 123r which has radially extending spring blades 123s. These blades as the wheel is driven extend into the chute groove and yieldingly engage the members in the chute groove and force them forward (see Figs. 9, 19 and 20). The wheel 123r is mounted on a shaft 123t which is journaled in a bearing 123u (see Fig. 19) and a pulley 123v is fixed on the shaft 123t and driven by a belt 123w from a pulley 123x on the shaft 123p. Thus the selecting and delivery of the selected members in proper relation to the end of the chute is assured.

Figures 16, 17:
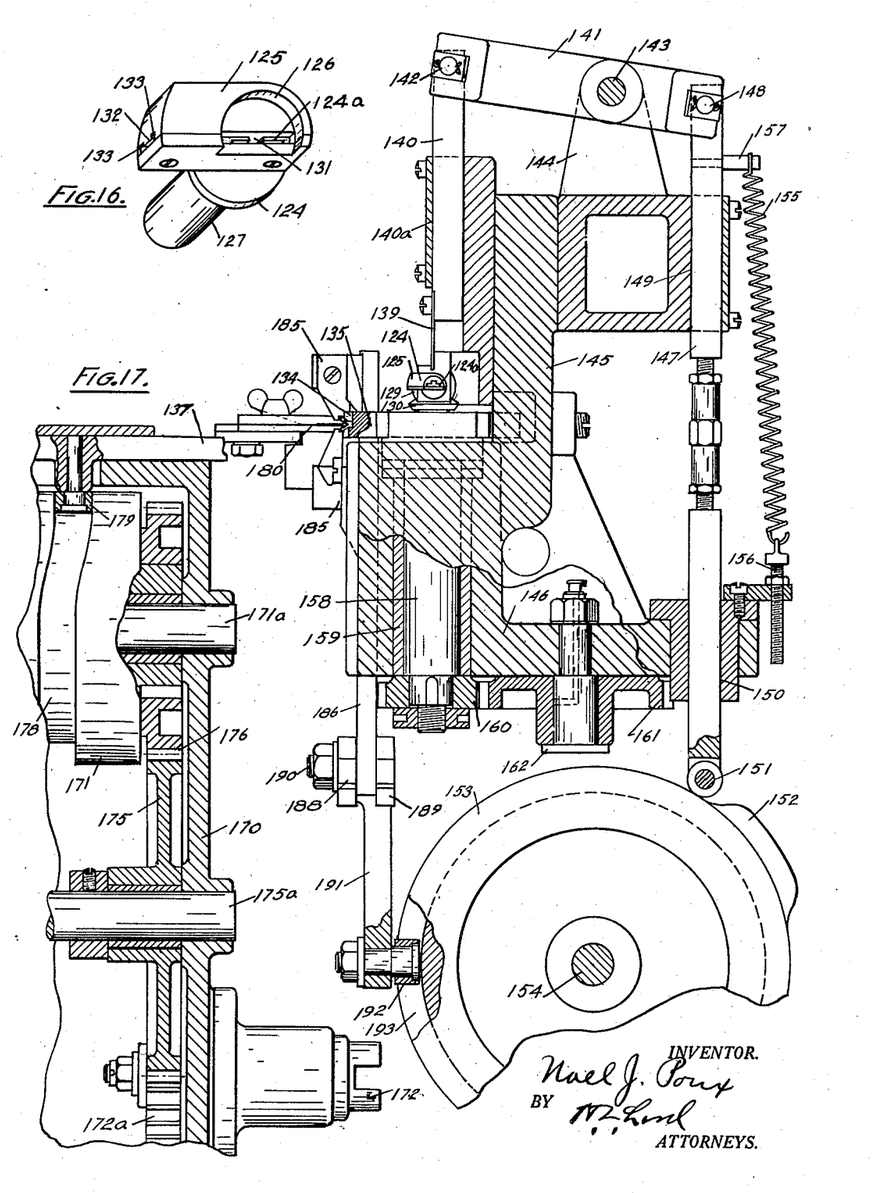
Fig. 16 a perspective view of the blank transferring device.
Fig. 17 a sectional view on the line 17—17 in Fig. 23.
Figure 21:
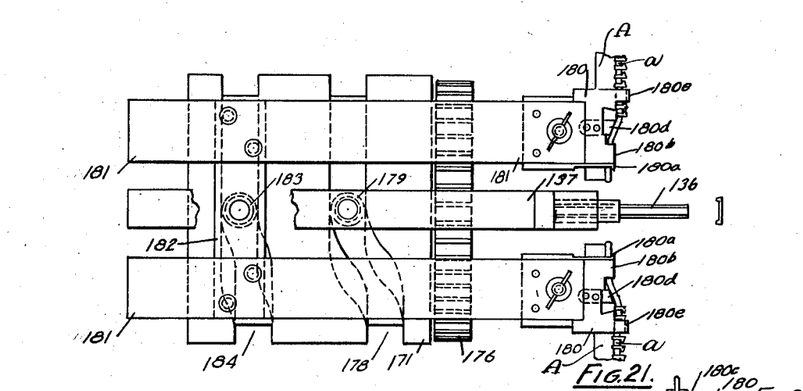
Fig. 21 a plan view of the severing punch and tape operating guides and their operating mechanism.

The positioning member is shown in enlarged perspective in Fig. 16. A groove 124a extends axially of the positioning head 125 and receives the blank members endwise. The head has a socket 126 into which the chute 123 extends so as to maintain a proper register with the groove 124a. The head has a spindle 127 and this spindle is carried in a bearing 128 (see Fig. 7). A beveled gear 129 is arranged on the end of the spindle and this meshes with a gear 130. These gears rock with a jaw-forming die head in a manner hereinafter described. Suffice to say they swing the positioning head 90°. The groove 124a has an extension 131 which permits the entrance of the projections. The members are received in a horizontal plane and by the rotation of the positioning head are turned to a vertical position and they are then forced through a groove 132 in the head, the groove 132 extending radially from the groove 124a. The groove 132 has extensions 133 for permitting the movement of the projections. The member blanks as they are ejected from the positioning head in a manner hereinafter described are forced into the jaw-forming dies shown in enlarged view in Figs. 13 and 23. These dies have die sockets 134 carried by heads 135. There are two of these heads and a part of the die is formed in each head where the blanks are formed of double members. Where the blanks are formed for only a single member only one head is required. A punch 136 carried by the punch bar 137 (see Figs. 13, 21 and 23) is advanced through the die 134 and removes the material of the interior of the jaws and severs the blank. This is accomplished regardless of whether the blanks are formed with the webs 27, or with full thickness of material between the jaws, as shown in Fig. 2, or with simply the bridges 215 as shown in Fig. 2a and with the single members regardless of how the material is punched out between the jaws. In any case the interior surface of the jaws is that left by the punch and sharp edges are preferably provided.

Figure 13:
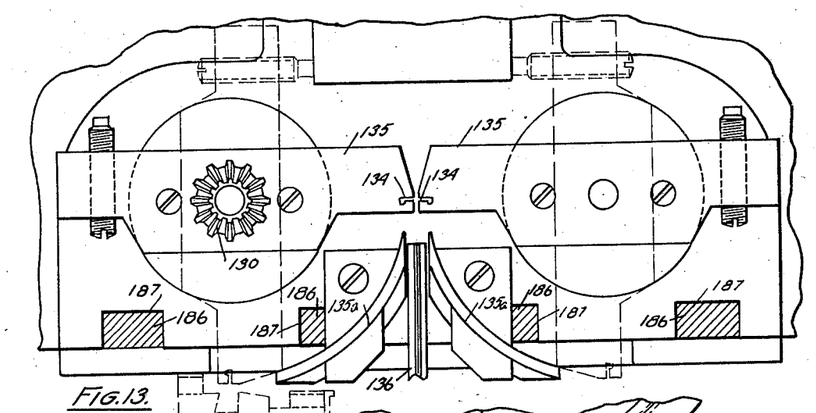
Fig. 13 a plan view of the blank severing and member positioning mechanism.
Figure 15:
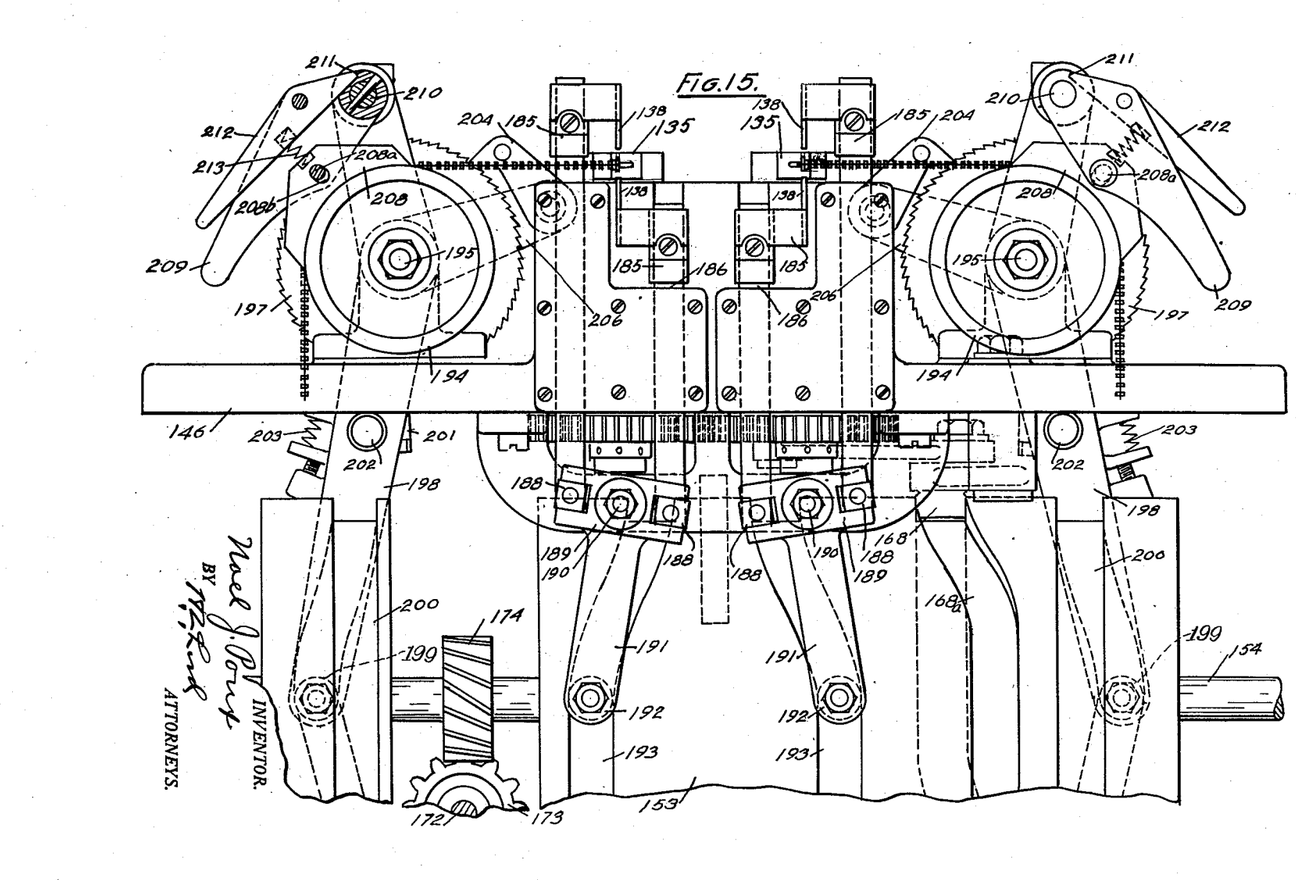
Fig. 15 an enlarged front view of the tape feeding and jaw setting mechanism.
Figures 21A, 22, 23:
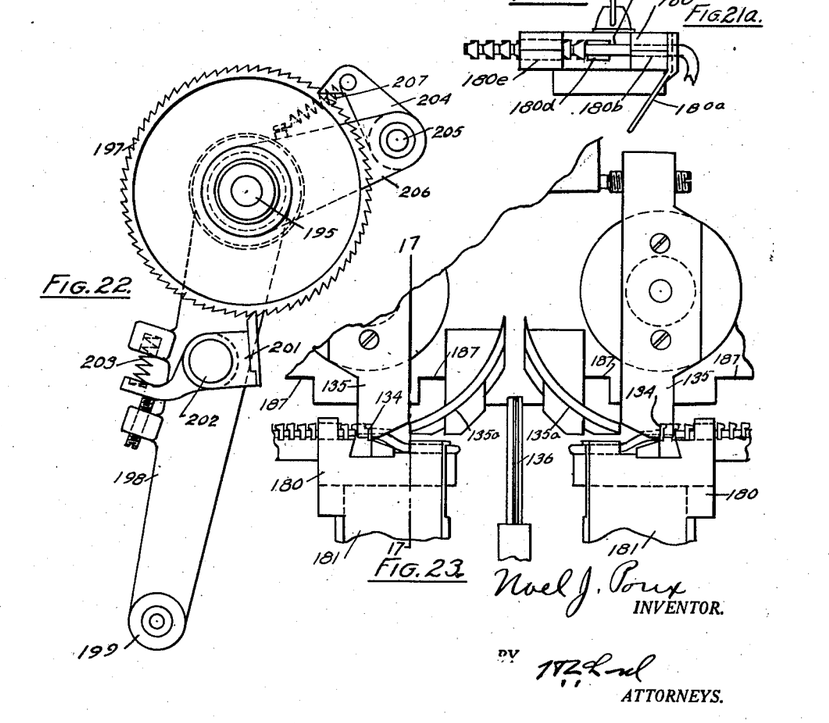
Fig. 21a an end view of one of the tape guides.
Fig. 22 a rear view of the tape feeding mechanism.
Fig. 23 an enlarged view of the severing dies with the severing dies oscillating to position an interlocking member on the stringer.

After the punching operation, the heads 135 are rotated 90° to the position shown in Fig. 23 and dotted position indicated in Fig. 13. This brings the open jaws of the members held by the dies in relation to receive the edges of the tapes as the tapes are forced forward by the tape guides, the tapes being fed forward into position between the jaws by a mechanism hereinafter described. With the tapes in position between the jaws, the jaws are closed by the closing plunger 138 (see Fig. 15). At the time of the closing operation the member is still held in the sockets 134 of the dies and consequently is held in vertical and proper position until the jaws are closed. The punch 136 is retained in its forward position during the initial swinging movement of the die head 135 and consequently the jaws of the severed blank follow along the surfaces of the punch as a guide and pass from the punch to the guide surfaces 135a. These surfaces retain the interlocking members in the die sockets and assure their proper movement with the die into a position over the tape. A push plate 139 is carried by a reciprocating bar 140 (see Fig. 17) which is slidingly mounted in a bearing 140a. The plate 139 is designed to enter the slot 132 in the positioning member 124 and force the member blank through the slot 132 and into the die 134 so that the member is definitely and properly seated in the dies 134 by the plate. A rock arm 141 is connected by a bearing 142 with the bar 140. The rock arm is pivotally mounted on a pin 143. The pin is mounted between ears 144. The ears 144 extend from a post 145. The post is formed on a frame 146 of the machine. A thrust bar 147 is connected by bearings 148 with the rocker 141. The thrust bar is slidingly mounted in bearings 149 and 150 and is provided with a cam roller 151 at its lower end. The cam roller is in the path of a cam 152 and this cam is properly timed to give to the plate 139 a feeding movement with relation to the movement of the positioning head 124 and die heads 135. The cam 152 is mounted on a cam cylinder 153. This cam cylinder is driven by a drive shaft 154. A spring 155 anchored at 156 is secured to a pin 157 on the thrust bar 147 and this spring returns the thrust bar and consequently the feeding plate after each operation.

Figure 14:
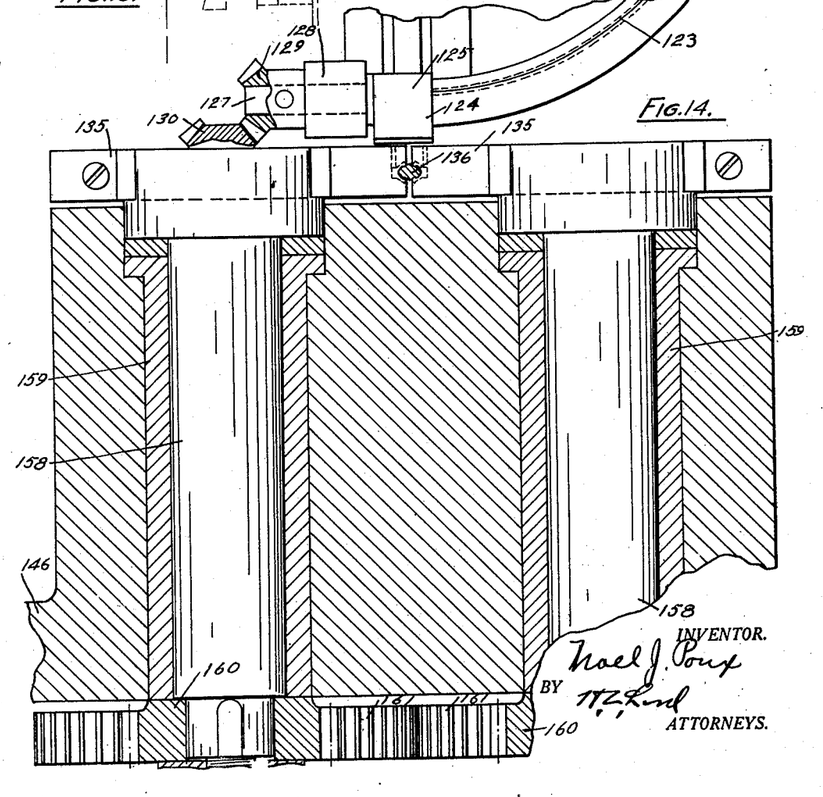
Fig. 14 an elevation of the severing die and feeding device therefor with the mountings therefor in section.
Figure 18:
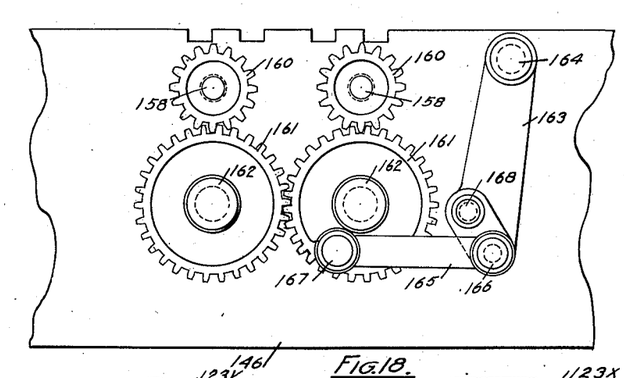
Fig. 18 shows a detail of the gearing for positioning the severing dies.

The die heads 135 are mounted on a spindle 158 (see Figs. 14 and 17) and these spindles are mounted in bearings 159 in the frame. Gears 160 are fixed at the lower ends of the spindles 158 and these mesh with gears 161. The gears 161 mesh with each other (see Fig. 18) so that the heads driven through these gears are rotated in opposite directions. The gears 161 are mounted on studs 162. A rock arm 163 is journaled on a stud 164 on the frame. A link 165 is connected with the rock arm 163 by a pin 166 and with one of the gears 161 by a pin 167. The rocker 163 is provided with a cam roller 168 which operates in a cam groove 168a (see Fig. 15) on the cam cylinder 153. Through this cam action the gears 161 are rocked sufficiently to turn the gears 160 90° and consequently the die heads 135 90° to transfer the members in the dies 134 from the punching position shown in Fig. 13 to the tape securing position shown in Fig. 23 and in dotted lines in Fig. 13.

Figures 7, 8, 8A:
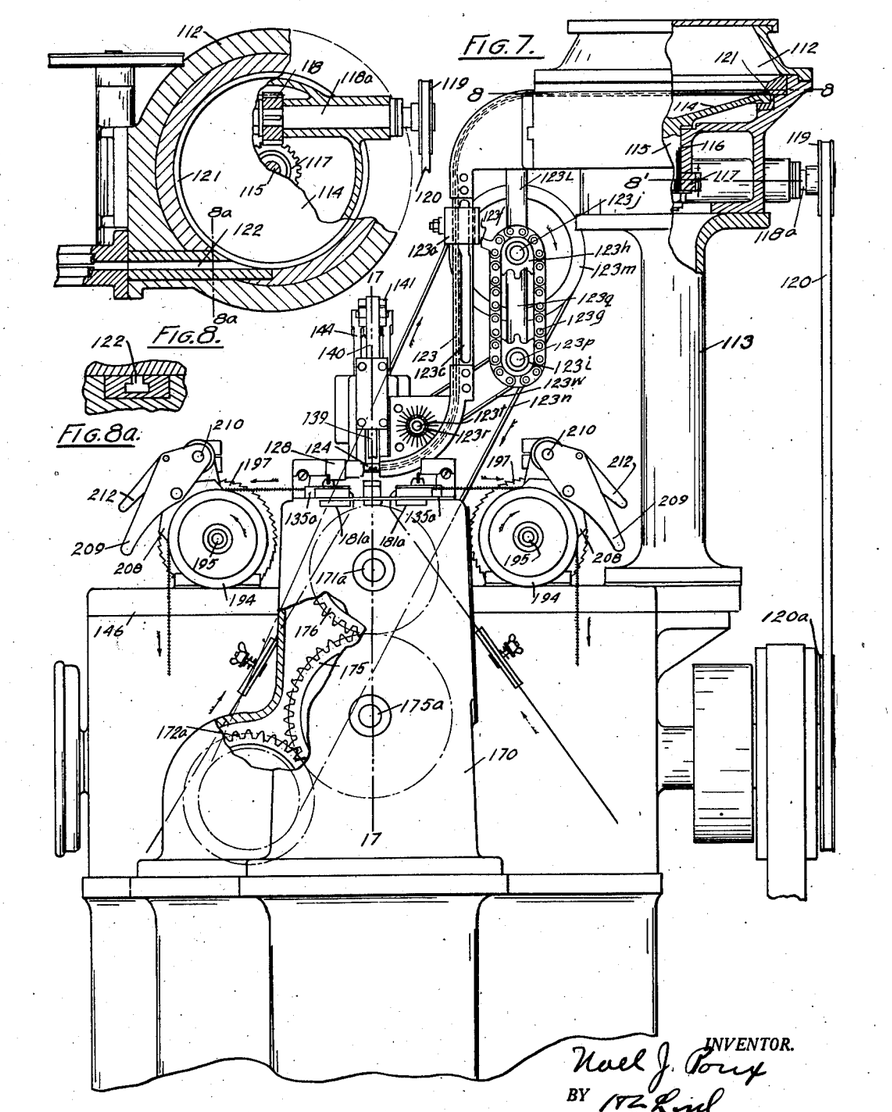
Fig. 7 a front elevation of the machine, some parts being in section.
Fig. 8 a section of the magazine, partly on the line 8—8 and partly on the line 8' in Fig. 7.
Fig. 8a a section on the line 8a—8a in Fig. 8.

A cam box 170 is arranged at the front of the machine (see Figs. 1 and 7). This box is carried by a projection 170a on the frame. A cam cylinder 171 (see Figs. 17 and 21) is journaled on a shaft 171a. The shaft 172 extends into the box and is driven from the drive shaft 154 (see Fig. 1) in the manner before stated. A gear 172a is fixed on the shaft 172 and meshes with a gear 175. The gear 175 is carried by a shaft 175a in the case and meshes with a gear 176 extending from the cam cylinder 171. The cam cylinder has a cam groove 178 and a cam roller 179 is arranged on the bar 137 and extends into this cam groove. In this way the punch bar 137 is reciprocated forward and back in proper time to punch the jaws and sever the blank. Tape guides 180 are mounted on reciprocating bars 181. The bars 181 are slidingly mounted in guide slots 181a in the box. A cross bar 182 is secured to both the bars 181 and a cam roller 183 is arranged at the center of the cross bar 182 and extends into a cam groove 184 so that the two tape guides are advanced and withdrawn with each cycle of the machine through the action of this cam. The tape is carried into the guide from a guide tape deflector 180a. It passes through a slot 180b into a slot 180c in the inclined tape rib positioning projection 180d and this places the rib a of the tapes A into proper position when the tape is forward in the jaws of the member held in the die. The projection 180d also assists in maintaining and positioning the members as the jaws are closed so that the members are in perfect alinement with the tape.

As the die heads 135 are swung around carrying the open-ended jaws into position facing the tape the tape is advanced by the tape guide carrying the tape between the jaws. The jaw closing plungers are then operated and the jaws securely clamped on the tape. The tape then with the attached members proceeds through the guide portion 180e.

The jaw closing plungers 138 are mounted on heads 185. These heads are carried by sliding bars 186. The bars are mounted in guides 187. The bars 186 have bearings 188 by which they are connected to rockers 189. The rockers are journaled on pins 190 and each rocker has an arm 191 terminating in a cam roller 192 (see Figs. 15 and 17). The rollers operate in cam grooves 193 on the cam cylinder 153. These cams give the jaw closing plungers a reciprocating motion timed with relation to the positioning of the interlocking members astraddle the edge of the stringer, or tape. It will be noted that the plungers 138 are very thin and operate in the die slots 134 so that the jaws are operated upon and are perfectly guided and held in place until closed.

The tape is advanced, step by step, so as to properly space, or position the members thereon. Each of the tapes is carried over a feed roll 194 (see Figs. 1, 7 and 15). The two feed rolls are directly alike and a description of one will apply to both. The feed roll 194 is carried by a spindle 195 journaled in a bearing 196 (see Fig. 1). A ratchet wheel 197 is fixed on the outer end of the spindle 195 and a rock arm 198 is journaled on the end of the bearing 196 concentric with the spindle. The rock arm has a cam roller 199 which operates in a cam groove 200 in the cam cylinder 153. A pawl 201 is pivotally mounted on a pin 202 and the pin 202 is mounted on the arm 198. A spring 203 yieldingly crowds the pawl into engagement with the ratchet wheel 197. A pawl 204 is pivotally mounted on a pin 205 and the pin 205 is mounted on a stationary arm 206. The pawl is urged into engagement with the ratchet wheel by a spring 207 and this pawl prevents a return movement of the ratchet wheel during a return movement of the pawl 201. With each cycle of the machine the cam drives the rock arm 198 and advances the ratchet wheel the space that may be desired. The tape as it passes from the feed wheel 194 is held in engagement thereby by a pressure shoe 208. This shoe is pivotally mounted in an arm 209 formed of spaced plates, the pivotal mounting being accomplished by a pin 208a arranged in a slot 208b. The arm is pivotally mounted on a pin 210. The end of the pin has a notch 211 which is adapted to engage a pawl 212. A spring 213 operates between the pawl 212 and the shoe 208 and exerts spring pressure on the shoe 208. By depressing the pawl 212 it is moved out of the catch 211 and permits the lifting of the shoe out of engagement.

From this it will be seen that a partly formed blank is provided in the form illustrated as examples in Figs. 2 to 6b inclusive. The bridged jaws permit of the easy hoppering and selecting of the devices so that they may be readily handled as independent pieces for plating, or polishing, as may be desired without making the further fabrication and securing of said members of great difficulty. As the devices are hoppered and selected they are again placed in the control of the guiding and advancing means of the machine by way of the chute. The hoppering device is of extreme simplicity and automatic means are provided for preventing jamming at the entrance to the chute. Further the members in the chute are subjected to continuous yielding pressure assuring their delivery to the point of operation. The members are taken from the chute and the jaws freshly formed so as to give desirable securing surfaces and the double members are severed through the action of the positioning mechanism and the punching operation. The several members with their open jaws are carried by the dies in which the punching is done by the oscillating heads into position opposite the tapes. The tapes are advanced transversely to bring the ribs of the tapes into the jaws. The jaws are closed, the parts successively retracted and the tape advanced longitudinally. The machine, therefore, permits of an economical and very desirable manner of forming separable fasteners in that it permits of the use of a wider range of materials in the formation of the fasteners, particularly a wider variation of materials where plating is used and it assures a more uniform polishing of the units and particularly the elimination of the rough edges. This not only is more thoroughly accomplished, but is accomplished without any injury of any kind to the tape, or stringer. Notwithstanding this nice finishing of the members the engaging surfaces of the jaws are substantially fresh such as are left by clean punching and more securely engage the tape than would be the case if the inner surfaces of the jaws were polished and rounded. One of the very definite advantages of the machine is the accuracy with which the members may be placed on the tape. The members are securely held both as to direction and as to the spacing with the preceding members as the jaws are closed. In consequence of these several features the opening, or closing of the finished fastener is smoother by reason of the fact that all rough edges, or corners, obstructing the free running are removed and also by reason of the fact that each member is properly directioned and spaced so that it swings into position freely yet uniformly and securely. In addition to this when the double blanks are used, which is the preferable form, the output per minute with an equal number of cycles of the machine is doubled.

The machine, as a whole, considering the number of necessary operations is extremely simple and rugged. The cams are grouped for convenience and cheapness of manufacture and the operating parts from the cams are so nearly direct as to reduce the lost motion to a minimum. This makes it possible to operate with very small tolerances and at high speeds assuring the extreme accuracy to which I have referred.

With the united members shown in Figs. 2a and 2b the punch 136a merely severs the members while the punch 136 is designed to not only sever the members, but to remove the material within the jaws. If desired, however, the same punch may be used in each case, the punch removing sufficient material from the inner edges of the jaws to re-surface them.

What I claim as new is:—

1. In a machine for making separable fasteners, the combination of a mechanism adapted to receive members in pairs united at the jaw ends; means acting on the members in the mechanism severing the members; and means delivering the severed members from the mechanism to individual stringers.

2. In a machine for making separable fasteners, the combination of a mechanism adapted to receive members in pairs united at the jaw ends; means acting on the members in the mechanism severing the members; and means moving the mechanism to position the severed members to individual stringers.

3. In a machine for making separable fasteners, the combination of a mechanism adapted to receive members in pairs united at the jaw ends; means acting on the members in the mechanism severing the members; means delivering the severed members from the mechanism to individual stringers; and means securing the members on the stringers to which they are attached.

4. In a machine for making separable fasteners, the combination of a mechanism adapted to receive members in pairs united at the jaw ends; means acting on the members in the mechanism severing the members; means moving the mechanism to position the several members to individual stringers; and means securing the members on the stringers to which they are delivered.

5. In a machine for making separable fasteners, the combination of a mechanism adapted to receive members in pairs united at their jaw ends and with material in the space between the jaw portions; and means severing a pair of members and removing the material in the space and surfacing the inner edges of the members.

6. In a machine for making separable fasteners, the combination of a mechanism adapted to receive members in pairs united at their jaw ends and with material in the space between the jaw portions; and means severing a pair of members and removing the material in the space and delivering the severed members to individual stringers.

7. In a machine for making separable fasteners, the combination of a die; a punch operating on a member in the die; means feeding and guiding a stringer; and means imparting reciprocating motion to the die to transfer the member punched to position it relatively to a stringer in the feeding and guiding means.

8. In a machine for making separable fasteners, the combination of a die; a punch operating on a member in the die; means feeding and guiding a stringer; and means imparting rotatively oscillating motion to the die to transfer the member punched to position it relatively to a stringer in the feeding and guiding means.

9. In a machine for making separable fasteners, the combination of a pair of complementary dies adapted to receive a pair of partially formed members; a punch operating on the members severing the same; means feeding and guiding a pair of stringers; and means imparting movement to the dies to transfer the punched members to the stringers.

10. In a machine for making separable fasteners, the combination of a pair of complementary dies adapted to receive a pair of partially formed members; a punch operating on the members severing the same; means feeding and guiding a pair of stringers; and means imparting oscillating movement to the dies to transfer the punched members to the stringers.

11. In a machine for making separable fasteners, the combination of a die; a punch operating on a member in the die; means feeding and guiding a stringer; means imparting reciprocating motion to the die to transfer the member punched to position it relatively to a stringer in the feeding and guiding means; and means securing the member to the stringer.

12. In a machine for making separable fasteners, the combination of a pair of complementary dies adapted to receive a pair of partially formed members; a punch operating on the members severing the same; means feeding and guiding a pair of stringers; means imparting movement to the dies to transfer the punched members to the stringers; and means securing the members transferred to the stringers.

13. In a machine for making separable fasteners, the combination of a pair of complementary dies adapted to receive a pair of partially formed members; a punch operating on the members severing the same; means feeding and guiding a pair of stringers; means imparting oscillating movement to the dies to transfer the punched members to the stringers; and means securing the members transferred to the stringers.

14. In a machine for making separable fasteners, the combination of a pair of complementary dies adapted to receive a pair of partially formed members having united jaw portions; a punch operating on the members and severing the same; means feeding and guiding a pair of stringers;

means imparting movement to the dies to transfer the members punched with their jaws astraddle the stringers; and means securing the members to the stringers by closing the jaws while the members are held by the dies.

15. In a machine for making separable fasteners, the combination of a die adapted to receive a partially formed member having jaw portions with material closing the ends of the jaws; a punch operating on the member removing the material; means feeding and guiding a stringer; means imparting reciprocating motion to the die to transfer the member punched to position it relatively to a stringer in the feeding and guiding means; and a closing punch closing the jaws on the stringer, said die having a guiding surface maintaining the alinement of the jaws as they are closed.

16. In a machine for making separable fasteners, the combination of a die adapted to receive a partially formed member having jaw portions with material closing the ends of the jaws; a punch operating on the member removing the material; means feeding and guiding a stringer; means imparting reciprocating motion to the die to transfer the member punched to position it relatively to a stringer in the feeding and guiding means; and a closing punch closing the jaws on the stringer, said die having a guiding surface for the punches and maintaining alinement of the jaws as they are closed.

17. In a machine for making separable fasteners, the combination of a die adapted to receive members with jaw portions; a punch operating on the member; means feeding a stringer; means imparting reciprocating motion to the die to transfer the member to a position opposite the stringer; and means advancing the stringer into the jaws positioned by the die.

18. In a machine for making separable fasteners, the combination of complementary dies adapted to receive a pair of partially formed members united at their jaw ends; a punch operating on the members and severing the same; means feeding a pair of stringers; means imparting movement to the dies to transfer the members punched to the stringers; and means advancing the stringers into the jaws positioned by the dies.

19. In a machine for making separable fasteners, the combination of a die; a punch operating on a member in the die; means feeding and guiding a stringer; means imparting reciprocating motion to the die to transfer the member punched to position it relatively to a stringer in the feeding and guiding means; and a guide engaging the member as the die moves the member to the stringer.

20. In a machine for making separable fasteners, the combination of a die; a punch operating on a member in the die; means feeding and guiding a stringer; means imparting reciprocating motion to the die to transfer the member punched to position it relatively to a stringer in the feeding and guiding means; and a guide engaging the member as the die moves the member to the stringer, the punch supplementing the guide in the guiding movement.

21. In a machine for making separable fasteners, the combination of a pair of complementary dies adapted to receive a pair of partially formed members; a punch operating on the pair of members severing the same; means feeding and guiding a stringer; means imparting movement to the dies to transfer the severed members punched to the stringers; and means guiding the members as the dies move holding the members in place.

22. In a machine for making separable fasteners, the combination of a pair of complementary dies adapted to receive a pair of partially formed members; a punch operating on the pair of members severing the same; means feeding and guiding a stringer; means imparting movement to the dies to transfer the severed members punched to the stringers; and means guiding the members as the dies move holding the members in place, said punch supplementing the guides in the guiding action.

23. In a machine for making separable fasteners, the combination of a die adapted to receive a member having material uniting the jaw portions; means feeding and guiding a stringer; means imparting motion to the die to transfer the member to the stringer; a punch operating on the member in the die removing the material; and a guide engaging the jaws as the member is transferred by the die.

24. In a machine for forming separable fasteners, the combination of a hoppering device comprising a rotating platform; a guide wall on which the members to be selected are positioned with a selected edge of the members next the wall by centrifugal force and rotative movement of the platform, said wall having a guide groove receiving a projecting portion from a member; and a discharge chute leading from the wall in continuation of the guide groove receiving the positioned members.

25. In a machine for making separable fasteners, the combination of a hoppering device having a rotating selecting hopper; a discharge chute leading therefrom; and means periodically forcing a return movement of a portion of the members in the chute to the hopper.

26. In a machine for making separable fasteners, the combination of a hoppering device having a rotating selecting hopper; a discharge chute leading therefrom; means periodically forcing a return movement of a portion of the members in the chute to the hopper comprising an actuator; and means imparting an actuating and releasing movement to the actuator.

27. In a machine for making separable fasteners, the combination of a hoppering device having a rotating selecting hopper; a discharge chute leading therefrom; means periodically forcing a return movement of a portion of the members in the chute to the hopper comprising a reciprocating actuator; and means imparting a reciprocating actuating and releasing movement to the actuator.

28. In a machine for making separable fasteners, the combination of a hoppering device having a rotating selecting hopper; a discharge chute leading therefrom; an actuator having a finger engaging members in the chute; mechanism moving the actuator lengthwise of the chute for returning a portion of the members to the hopper; and means imparting a sidewise movement to the actuator to release the finger.

29. In a machine for making separable fasteners, the combination of a hoppering device having a rotating selecting hopper; a discharge chute leading therefrom; an actuator having a finger engaging members in the chute; mechanism moving the actuator lengthwise of the chute for returning a portion of the members to the hopper, said mechanism comprising a rotating chain having a lug engaging the actuator along one reach of the chain and releasing the actuator at the end of the reach; and means imparting sidewise movement to the actuator to release the finger.

30. In a machine for making separable fasteners, the combination of a hoppering device having a rotating selecting hopper; a discharge chute leading therefrom; means periodically forcing a return movement of a portion of the members in the chute to the hopper; and a yielding driver acting on the members remaining in the chute as the means is returned.

31. In a machine for making separable fasteners, the combination of a hoppering device having a rotating selecting hopper; a discharge chute leading therefrom; means periodically forcing a return movement of a portion of the members in the chute to the hopper; and a yielding driver acting on the members remaining in the chute as the means is returned, said yielding driver comprising a wheel with radially extending yielding blades engaging the members in the chute.

32. In a machine for making separable fasteners, the combination of a selecting device comprising a chute; and means yieldingly forcing movement of selected members in the chute comprising a rotating wheel having yielding radially extending blades engaging such members.

33. In a machine for forming separable fasteners, the combination of a punching die; a chute guiding separated selected members; and an oscillating positioning device receiving members from the chute and delivering the same to the die.

34. In a machine for forming separable fasteners, the combination of a punching die; a chute guiding separated selected members; and an oscillating positioning device receiving members from the chute and delivering the same to the die, said positioning device having a guide channel alining with the chute in one position and with the die in a second position.

35. In a machine for forming separable fasteners, the combination of a die; a chute for selected members; an oscillating positioning device receiving members from the chute and delivering the same to the die, said positioning device having a guide channel alining with the chute in one position and with the die in a second position; and means forcing members from the channel into the die.

36. In a machine for forming separable fasteners, the combination of a feeding means for a stringer comprising a feed pulley; a yielding pressure shoe acting on a stringer on the pulley; a pivoted carrier for the shoe; and a latch permitting the pivotal release of the carrier.

37. In a machine for making separable fasteners, the combination of a pair of complementary dies; oscillating heads for the dies; means acting on members in the dies; and actuating means for oscillating the dies for transferring the members comprising concentric cams for both dies.

38. In a machine for making separable fasteners, the combination of a pair of complementary dies; oscillating heads for the dies; an oscillating positioning device delivering member forms to the dies; means acting upon the members in the dies; and actuating means oscillating the dies and the positioning device comprising concentric cams.

39. In a machine for making separable fasteners, the combination of a pair of complementary dies; oscillating heads for the dies; means acting on members in the dies severing the same and providing open jaws; a tape feeding device; and concentric cams operating the dies and the feeding device.

40. In a machine for making separable fasteners, the combination of a pair of complementary dies; oscillating heads for the dies; means acting on members in the dies severing the same and providing open jaws; a tape feeding device; mechanism closing the jaws on the tape; and actuating means oscillating the dies and the mechanism comprising concentric cams.

41. In a machine for making separable fasteners, the combination of complementary dies; means operating on members in the dies severing the same and providing open jaws; a tape feeding device; a jaw closing mechanism; and concentric cams oscillating said dies and actuating said feeding device and closing mechanism.

42. In a machine for making separable fasteners, the combination of a pair of complementary dies; oscillating heads for said dies; a punch operating on members in said dies; actuating means oscillating the dies comprising a pair of cams; and means reciprocating the punch comprising a cam.

43. In a machine for making separable fasteners, the combination of a pair of complementary dies; oscillating heads for said dies; a punch operating on members in the dies severing the same and providing open jaws; tape feeding devices; jaw closing mechanism; guide means advancing the tape into the jaws; actuating means for the dies, feed devices and mechanism comprising concentric cams; and actuating means for the punch and the guiding means comprising concentric cams.

44. In a machine for making separable fasteners, the combination of a hoppering device comprising a carrier moving partially formed members having longitudinal variations in shape; a selector acting on the variations of the members selecting only the members presenting the variations in proper position; a shaping mechanism for operating on the selected members; and transfer means taking the members from the selector and transferring them to the shaping mechanism and from the shaping mechanism to a stringer with a maintained uniform relation of the variations of the members.

45. In a machine for making separable fasteners, the combination of a hoppering device comprising a carrier moving partially formed members having longitudinal variations in the form of one side only projections; a selector acting on the variations of the members selecting only the members presenting variations in proper position; a shaping mechanism for operating on the selected members; and transfer means taking the members from the selector and transferring them to the shaping mechanism and from the shaping mechanism to a stringer with a maintained uniform relation of the variations of the members.

46. In a machine for making separable fasteners, the combination of a hoppering device comprising a carrier moving partially formed members having longitudinal variations in shape; a selector acting on the variations of the members selecting only the members presenting the variations in proper position; a shaping mechanism for operating on the selected members; transfer means taking the members from the selector and transferring them to the shaping mechanism and from the shaping mechanism to a stringer with a maintained uniform relation of the variations of the members; and means securing the members delivered to the stringer successively to the stringer.

47. In a machine for making separable fasteners, the combination of a hoppering device comprising a carrier moving partially formed members having longitudinal variations in shape; a selector acting on the variations of the members selecting only the members presenting the variations in proper relation; a shaping mechanism for operating on the selected members removing the material therefrom to form the interior of securing jaws; and transfer means taking the members from the selector and transferring them to the shaping mechanism with a maintained uniform relation of the variations of the members.

48. In a machine for making separable fasteners, the combination of a hoppering device comprising a carrier moving partially formed members having longitudinal variations in shape; a selector acting on the variations of the members selecting only the members presenting the variations in proper relation; a shaping mechanism for operating on the selected members removing the material therefrom to form the interior of securing jaws; and transfer means taking the members from the selector and transferring them to the shaping mechanism and from the shaping mechanism to a stringer with a maintained uniform relation of the variations of the members.

49. In a machine for making separable fasteners, the combination of a hoppering device comprising a carrier moving partially formed members with longitudinal variations at each end of the member in the form of projections; a selector acting on the variations at each end of the partially formed members delivered to the selector by the carrier in proper position with respect to the variations at both ends; a shaping mechanism for operating on the selected members; and transfer means taking the members from the selector and transferring them to the shaping mechanism and from the shaping mechanism to stringers with a maintained uniform relation of the variations of the members.

50. In a machine for making separable fasteners, the combination of a hoppering device comprising a carrier moving partially formed members with longitudinal variations at each end of the member in the form of projections; a selector acting on the variations at each end of the partially formed members delivered to the selector by the carrier in proper position with respect to the variations at both ends; a shaping mechanism removing material from the interior of the partially formed member to form securing jaws and severing the partially formed member to provide two fastener units; and transfer means taking the members from the selector, delivering them to the shaping mechanism and maintaining a uniform relation of the variations.

51. In a machine for making separable fasteners, the combination of a hoppering device comprising a carrier moving partially formed members with longitudinal variations at each end of the member in the form of projections; a selector acting on the variations at each end of the partially formed members delivered to the selector by the carrier in proper position with respect to the variations at both ends; a shaping mechanism removing material from the interior of the partially formed member to form securing jaws and severing the partially formed member to provide two fastener units; and transfer means taking members from the selector and transferring them to the shaping mechanism and from the shaping mechanism to stringers with a maintained uniform relation of the variations of the members.

52. In a machine for making separable fasteners, the combination of a hoppering device comprising a carrier moving partially formed members with longitudinal variations at each end of the member in the form of projections; a selector acting on the variations at each end of the partially formed members delivered to the selector by the carrier in proper position with respect to the variations at both ends; a shaping mechanism removing material from the interior of the partially formed member to form securing jaws and severing the partially formed member to provide two fastener units; transfer means taking the members from the selector and transferring them to the shaping mechanism and from the shaping mechanism to stringers with a maintained uniform relation of the variations of the members; and means closing the jaws on the stringers.

53. In a machine for forming separable fasteners, the combination of a hoppering device comprising a rotatable platform; means for rotating the platform at a speed throwing the material thereon to the periphery thereof; and a peripheral guide wall on which members to be hoppered and selected are positioned by centrifugal force and rotating movement of the platform, said guide wall having a guide groove adapted to receive a portion of a member and obstruct another portion of a member to assist in the selection of the members.

NOEL JOSEPH POUX.